US012325039B2

(12) United States Patent
Ansorge et al.

(10) Patent No.: US 12,325,039 B2
(45) Date of Patent: Jun. 10, 2025

(54) TANK CLEANING DEVICE AND METHOD

(71) Applicant: GEA TUCHENHAGEN GMBH, Buchen (DE)

(72) Inventors: Tina Ansorge, Buchen (DE); Karsten Becker, Buchen (DE); Christopher Lawton, Buchen (DE)

(73) Assignee: GEA TUCHENHAGEN GMBH (DE)

( * ) Notice: Subject to any disclaimer, the term of this patent is extended or adjusted under 35 U.S.C. 154(b) by 585 days.

(21) Appl. No.: 17/627,278

(22) PCT Filed: Aug. 6, 2020

(86) PCT No.: PCT/EP2020/072160
§ 371 (c)(1),
(2) Date: Jan. 14, 2022

(87) PCT Pub. No.: WO2021/032500
PCT Pub. Date: Feb. 25, 2021

(65) Prior Publication Data

US 2022/0258187 A1 Aug. 18, 2022

(30) Foreign Application Priority Data

Aug. 20, 2019 (DE) ......................... 102019005831.3

(51) Int. Cl.
*B05B 3/04* (2006.01)
*B05B 13/06* (2006.01)
(Continued)

(52) U.S. Cl.
CPC .......... *B05B 3/0459* (2013.01); *B05B 3/0445* (2013.01); *B05B 13/0636* (2013.01); *B05B 15/65* (2018.02); *B08B 9/0936* (2013.01)

(58) Field of Classification Search
CPC ..... B05B 3/0459; B05B 15/65; B05B 3/0445; B05B 13/0636; B08B 9/0936
(Continued)

(56) References Cited

U.S. PATENT DOCUMENTS

2003/0015603 A1 1/2003 Schreur et al.
2017/0120312 A1 5/2017 Hoffmeyer et al.
2018/0236467 A1* 8/2018 Moeschl ............... B08B 9/0936

FOREIGN PATENT DOCUMENTS

CN 102327874 1/2012
CN 102921652 2/2013
(Continued)

OTHER PUBLICATIONS

CN102327874A—machine translation (Year: 2012).*
(Continued)

*Primary Examiner* — Tinsae B Ayalew
(74) *Attorney, Agent, or Firm* — Merek, Blackmon & Voorhees, LLC

(57) ABSTRACT

The invention relates to a tank cleaning device comprising a tank cleaner (1) having a drive means (18) comprising a drive means component, a nozzle holder (5) rotatable about two axes (D, L) and at least one nozzle (6) arranged on the nozzle holder (5). In order to adapt the tank cleaner quickly to a particular use thereof, it is proposed that at least one of the components drive means (18), drive means component, nozzle holder (5) and nozzle (6) be designed as a replaceable element, that the type of replaceable element be defined by said component, that the tank cleaner (1) include a replaceable element holder, and that a first group (27) comprising at least two replaceable elements of one type be provided. A method for operating a tank cleaning device and a method for cleaning a tank are also proposed.

8 Claims, 2 Drawing Sheets

Figure 1:
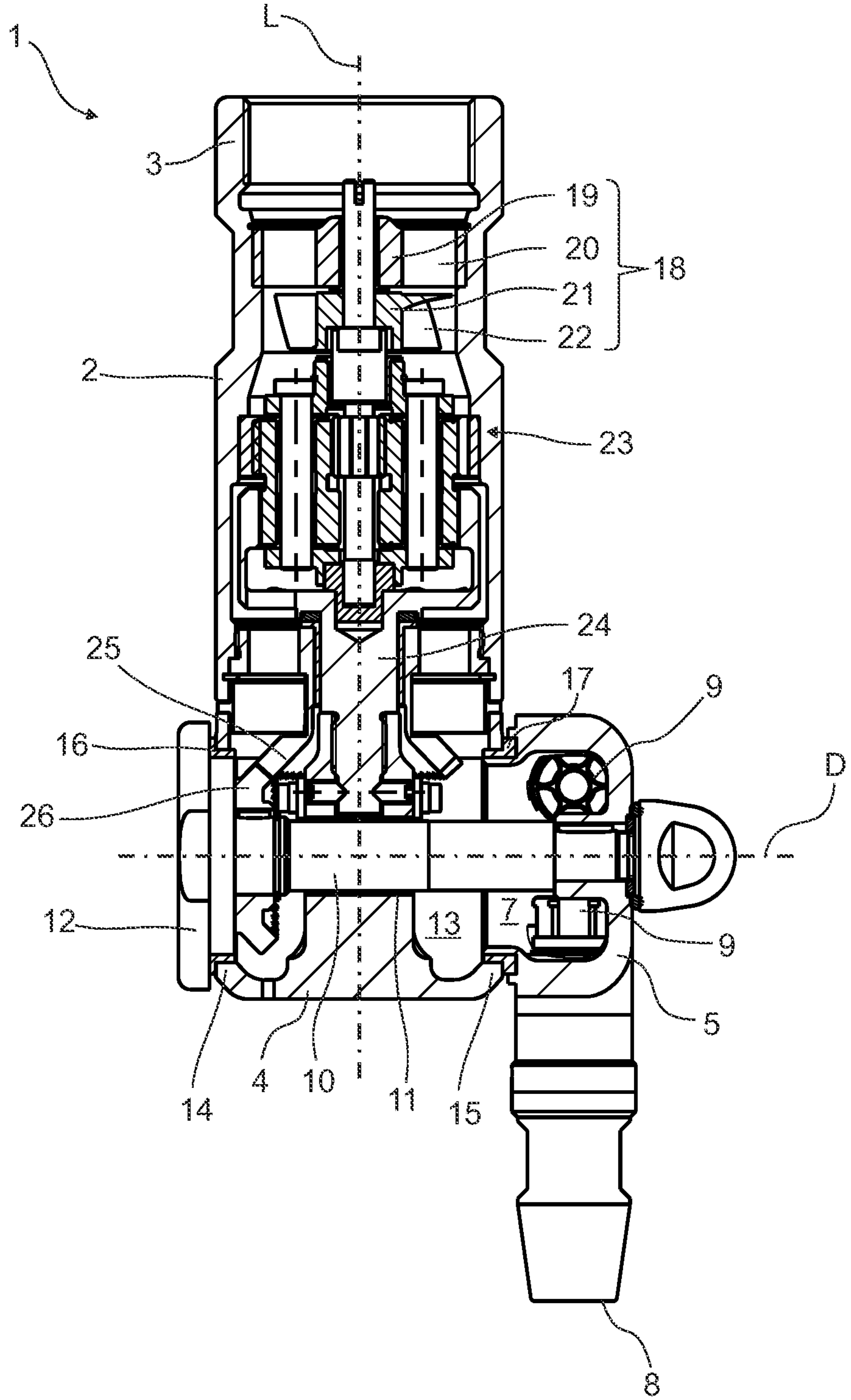

(51) Int. Cl.
*B05B 15/65* (2018.01)
*B08B 9/093* (2006.01)

(58) Field of Classification Search
USPC .................................................... 134/166 R
See application file for complete search history.

(56) References Cited

FOREIGN PATENT DOCUMENTS

| | | | |
|---|---|---|---|
| CN | 107921450 | 4/2018 | |
| DE | 8706489 | 10/1987 | |
| DE | 20302478 | 7/2003 | |
| DE | 20302478 U1 * | 7/2003 | ............... B05B 3/02 |
| DE | 102017222730 | 6/2019 | |
| FR | 2862241 | 5/2005 | |
| JP | H09174011 | 7/1997 | |
| WO | WO2018130650 | 7/2018 | |

OTHER PUBLICATIONS

DE20302478U1—machine translation (Year: 2003).*
International Search Report issued in International Application No. PCT/EP2020/072160, 3 pages.
Written Opinion of the International Searching Authority issued in International Application No. PCT/EP2020/072160, 6 pages.
Chinese Office Action dated Feb. 12, 2023 issued in connection with Chinese Application No. 202080057048.X.
Machine generated translation of Chinese Office Action dated Feb. 12, 2023 issued in connection with Chinese Application No. 202080057048.X.

* cited by examiner

TANK CLEANING DEVICE AND METHOD

The invention relates to a tank cleaning device, a method for operating a tank cleaning device and a method for cleaning tanks.

Tanks and vessels of different sizes are used in processing plants for the production of beverages and food, as well as precursors and products of the pharmaceutical and biotechnology industries. Their capacities can amount to several dozen cubic metres.

It is essential to prevent any microbial contamination of the vessels or adhesion of ageing residues to the inner walls of vessels. To achieve that purpose, tank cleaners, for example orbital cleaners, are used which have at least one nozzle that rotates about two axes and thus achieves complete coverage of the inner wall of the vessel. A jet of cleaning liquid or cleaning fluid exits the nozzle and removes residues from the inner wall of the vessel.

Selecting a cleaning fluid now depends on a number of parameters, for example the pressure at which cleaning fluid is available in the processing plant, the size of the vessel, but also the chemical and physical properties of the process fluid.

The parameters can be precisely measured only to varying degrees, so in many cases selecting from several different cleaners can only be done on the basis of in situ tests conducted in the processing plant.

On the other hand, such tests involve a substantial amount of time and material, for example by providing several test cleaners that have to be tested separately one after the other.

The object of the invention was therefore to present a tank cleaning device that reduces the time and effort needed to achieve the best possible cleaning result.

This object is achieved with a tank cleaning device having the features of claim 1, a method according to claim 4 for operating a tank cleaning device and a method according to claim 8 for cleaning a tank. The dependent claims specify advantageous developments of the invention.

A tank cleaning device comprises a tank cleaner having a drive means comprising a drive means component, a nozzle holder rotatable about two axes and at least one nozzle arranged on the nozzle holder, wherein the drive means, drive means component, nozzle holder and nozzle are components of the tank cleaner. Adapting the tank cleaner to the particular use thereof in a tank or vessel is now made easier by at least one of the components drive means, drive means component, nozzle holder and nozzle being designed as a replaceable element, by the type of replaceable element being defined by said component, by the cleaner including a replaceable element holder for receiving a replaceable element, and by a first group comprising at least two replaceable elements of one type. Designing one of these components as a replaceable element and providing a plurality of replaceable elements having different properties allows the tank cleaner and its cleaning effect to be modified by replacing one or more replaceable elements. In addition to the replaceable element already installed on the tank cleaner, the first group includes at least one additional replaceable element for replacement, so the first group contains at least two replaceable elements in total.

These advantages are achieved more easily if the tank cleaning device includes a second group comprising replaceable elements of a second type. This allows several tank cleaner parameters that affect the cleaning performance to be adjusted, for example the number of cleaning jets, the rotational speed, the jet width and the like.

In one embodiment of the tank cleaning device, a further improvement is achieved by providing a display element which displays at least one combination of replaceable elements from the first and second groups. This makes it easier to select a replaceable element and allows faster adaptation of the tank cleaner to the given conditions.

The method for operating such a tank cleaning device comprises the steps of:

selecting a replaceable element from a first group of replaceable elements of one type installing a replaceable element on a tank cleaner.

Selecting and subsequently installing a replaceable element obviates the need to replace the entire tank cleaner in order to find the model with the best cleaning properties for use in a tank.

This method is advantageously developed by selecting the replaceable element by means of a display on a display element. Selection is made easier and is carried out in a targeted manner.

According to another development, the method includes the further step of selecting a second replaceable element from a second group of replaceable elements of a second type. This allows several parameters that affect the tank cleaning performance to be modified simultaneously. The aim of achieving the best tank cleaning is attained more quickly.

According to a next development of this method, the display element displays at least one combination of replaceable elements from the first group and from the second group, and a first replaceable element and a second replaceable element are selected on the basis of said display. This limits the selection of the replaceable elements in a targeted manner and makes selection easier for the operator. The aim of achieving the best tank cleaning is attained even more quickly.

In a method for cleaning a tank by means of a tank cleaner in which cleaning fluid is dispensed into the tank from a nozzle mounted on a nozzle holder of the tank cleaner, which nozzle is made to rotate by a drive means that has a drive means component, said method comprises the steps of:

configuring the tank cleaner with a replaceable element holder, configuring one of the components drive means, drive means component, nozzle holder and nozzle as a replaceable element which can be accommodated in the replaceable element holder and by which a first type of replaceable element is defined, providing a group comprising a plurality of replaceable elements of one type. This method results in a modular, adaptable tank cleaner that allows manufacturers and operators to set up the tank cleaner very quickly to meet the needs of a specific application.

This method is improved by providing a second group comprising a plurality of replaceable elements. This increases the range of parameters with which the cleaning performance can be modified and adapted in a targeted manner.

In a further development, the method includes a step in which a display element is provided that displays at least one combination of a replaceable element from the first group and a replaceable element from the second group. This makes it easier to select the replacement elements in order to adapt the tank cleaner and speeds up the process of finding the best tank cleaner setup.

The invention shall now be described in further detail with reference to an embodiment and developments of the invention, and the effects and advantages shall be described in greater depth.

Figure 2:
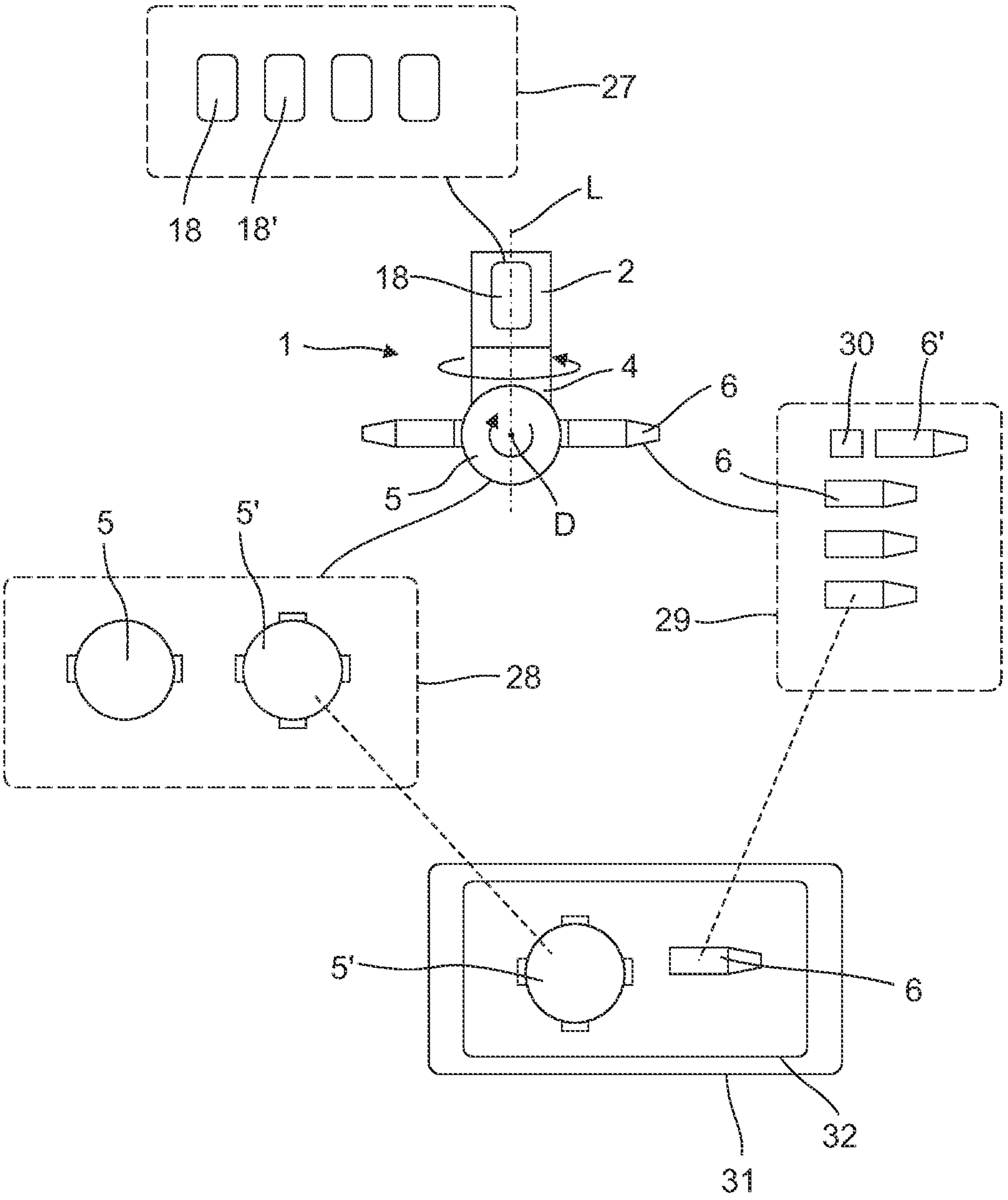

In the Figures,

FIG. 1: shows a cross-section through a tank cleaner;

FIG. 2: shows a schematic view of a tank cleaning device.

FIG. 1 shows a longitudinal cross-section of a tank cleaner 1 according to the invention. It has a first housing portion 2 that has a coupling section 3 at a first end. With the aid of the appropriately designed coupling section 3, tank cleaner 1 can be connected to a feed line through which the cleaning fluid can flow into tank cleaner 1 The connection between the feed line and tank cleaner 1 can be designed as a screw connection. Coupling section 3 then comprises a thread which engages with a mating thread on the feed line when tank cleaner 1 is fitted to the feed line.

At one end of the first housing portion 2 facing away from coupling section 3, a one-piece or multi-piece second housing portion 4 is rotatably arranged. The rotational axis of the rotational movement of the second housing portion 4 can coincide with a longitudinal axis L of the stationary housing portion 2.

A nozzle holder 5 rotatable about a second rotational axis D is located on the second housing portion 4. At least one nozzle 6, the shape of which forms a jet of cleaning fluid, is connected to nozzle holder 5. In order to conduct the fluid better and improve the cleaning jet, a flow director 9 may be arranged between an interior space 7 of nozzle holder 5 and an outlet 8 of nozzle 6. Flow director 9 includes a plurality of parallel flow channels, thus resulting in a more uniform flow of fluid.

Nozzle 6 is detachably and replaceably attached to nozzle holder 5, for example by clamping or by means of a pin connection. A particularly favourable embodiment is one in which nozzle 6 is provided with a thread and a nozzle receiver on nozzle holder 5 is provided with a corresponding mating thread. Nozzle 6 is then screwed into nozzle holder 5. Nozzle 6 is thus one type of replaceable element. The nozzle receiver formed on nozzle holder 5 forms a replaceable element holder corresponding to the type of replacement element.

Nozzle holder 5 is detachably attached to a shaft 10 which is rotatably arranged in the second housing portion 4. Due to this detachable attachment, nozzle holder 5 forms a second type of replaceable element. Drive shaft 10 forms a replaceable element holder assigned to this second type.

In the second housing portion 4, drive shaft 10 passes through a drive shaft holder 11 provided with a through hole. Drive shaft 10 is supported in this drive shaft holder 11, for which purpose an additional bearing ring may be provided in drive shaft holder 11.

A cover plate 12 is arranged at one end of drive shaft 10 facing away from nozzle holder 5. A diameter of cover plate 12 is dimensioned and a surface facing a cavity 13 of the second housing portion 4 is designed in such a way that a force is generated by pressurised fluid in cavity 13, which force compensates for a force that is produced by the fluid acting on nozzle holder 5 and that acts on drive shaft 10.

The second housing portion 4 has a first opening 14, and a second opening 15 arranged on a side facing away from the first opening. The openings span planes whose surface normals are parallel to each other and approximately perpendicular to longitudinal axis L. The first opening is closed by cover plate 12, the second opening 15 by nozzle holder 5. Drive shaft 10 passes through both openings 14 and 15. A first ring 16 is arranged between cover plate 12 and one edge of the first opening 14. A second ring 17 is located between one edge of the second opening 15 and nozzle holder 5. Both rings 16 and 17 act primarily as sealing rings to greatly reduce any leakage of cleaning fluid from tank cleaner 1 at these points. They may be designed as bearing rings in addition or as an alternative to drive shaft holder 11, in order to rotatably support cover plate 12 and nozzle holder 5. Rings 16 and 17 may together or individually have at least one split along a circumference, which can create a small gap. This allows compensation of any expansion caused by split ring 16 and/or 17 heating up.

A drive means 18 which converts the flow energy of the cleaning fluid flowing through the feed line into tank cleaner 1 is provided in the first housing portion 2 in order to cause nozzle holder 5 to rotate. Drive means 18 advantageously comprises an idle guide wheel 19 having at least one guide vane 20, and downstream a rotatably arranged turbine wheel 21 having at least one turbine vane 22. Turbine wheel 21 is operatively connected to a transmission gear 23 which may be designed as a planetary gear. Guide wheel 19 and turbine wheel 21 are each a drive means component. A single drive means component or drive means 18 in its entirety may form a replaceable element and define one type of replaceable element. The replaceable drive means 18 or its replaceable drive means components are accommodated in tank cleaner 1 in a replaceable element holder. In the example shown, the replaceable element holder includes a cylindrical recess in the first housing portion 2, which receives guide wheel 19, and a drive shaft of transmission gear 23, to which turbine wheel 21 is connected.

Guide wheel 19 and turbine wheel 21 are arranged such that they can be removed through coupling section 3. This additionally reduces the time and effort needed to achieve the best possible cleaning result of tank cleaner 1 by adapting the rotational behaviour, in particular the rotational speed, to the circumstances of the tank by replacing the drive means or the drive means components.

A drive shaft 24 of transmission gear 23 is mechanically connected to the second housing portion 4 and causes the second housing portion to rotate about longitudinal axis L.

A first bevel gear wheel 25 which engages with a second bevel gear wheel 26 is disposed on drive shaft 24. The latter gear wheel is attached to drive shaft 10, which is approximately at right angles to drive shaft 24. Due to the engagement of bevel gear wheels 25 and 26, drive shaft 10 is made to rotate about a second rotational axis D as soon as fluid impinges on drive means 18.

Drive means 18, the drive means components, nozzle holder 5 and nozzle 6 are components of tank cleaner 1.

FIG. 2 shows a schematic view of a tank cleaning device that includes a tank cleaner 1.

The tank cleaning device includes a first group 27 comprising replaceable elements of a first type. This first type is defined by the type of replaceable element, the selected type being the drive means type, the group comprising at least one first drive means 18 and one second drive means 18'.

Drive means 18 and 18' differ in their performance parameters. In the example of a drive means 18, 18' comprising a guide wheel 19 and a turbine wheel 21, the difference in performance parameters is achieved by the wheels of drive means 18 and 18' having different numbers and blade angles of guide vane 30 and turbine vane 22. This makes it possible, for example, to change the rotational speed that can be generated by the drive means and to adapt it to the fluid pressure of the cleaning fluid in the feed line.

A second group 28 in the tank cleaning device comprises at least two replaceable elements of the nozzle holder 5 and 5' type. Nozzle holders 5 and 5' of this second group 28 differ, for example, in the number of replaceable element holders and hence in the number of nozzles 6 that can be connected to a single nozzle holder 5, 5'. For example, the group may comprise nozzle holders having two, three and four nozzle receivers.

The tank cleaning device has a third group 29 comprising at least two replaceable elements of the nozzle 6 and 6' type. The replaceable elements in this third group 29 differ, for example, in the diameter of the fluid outlet and in the length of nozzle 6, 6'. In order to extend the length between the nozzle outlet and nozzle holder 5, 5', at least one extension sleeve 30 that can be mounted between nozzle holder 5, 5' and nozzle 6, 6' may additionally be provided. The aforementioned parameters affect the diameter of the jet of cleaning agent that hits the inner wall of the tank, and the force of impact of the cleaning agent. Nozzles 6, 6' may also differ additionally in respect of the properties of the surfaces exposed to the cleaning agent, for example in their surface roughness.

The tank cleaning device includes a display element 31 provided with a display panel 32. At least one combination of replaceable elements from at least two groups comprising different types of replaceable element is displayed on this display panel 32. Based on what is displayed, the user of the tank cleaning device can now select replaceable elements from the groups of replaceable elements and install them in tank cleaner 1. FIG. 2 shows the case where the combination of a replaceable holder 5' with a nozzle 6 is shown on display panel 32.

Thanks to the display, there is greater certainty that only those components that cooperate well with each other and which ensure a good cleaning effect are installed in the tank cleaner. This prevents unfavourable pairings of components when swapping components, and speeds up adaptation to the circumstances in a tank.

Display element 31 may be embodied in different ways. A paper document showing a display panel 32, for example in the form of a table, a list or the like, is a very simple and inexpensive embodiment.

For example, the columns in a table can refer to different nozzles with different aperture diameters, and the rows of the table to different nozzle holders. If a nozzle can be combined with a nozzle holder such that a good cleaning effect is achieved, the cell at the respective intersection of row and column is highlighted.

A more flexible solution is a computer or mobile data device such as a tablet running an application that accesses a data table or database, for example, and which outputs sensible combinations of different types of component. Display element 32 may then take the form of a display, a touchscreen or a computer screen. This makes it easier to find the combinations and makes it easier to adapt the data being used to adjusted circumstances, for example the availability of new components in a group.

Regardless of the form taken by display element 31 and display panel 32, an assessment of a particular combination of components in respect of the cleaning performance to be expected can be stored in the data set and displayed accordingly.

Different sizes of tank cleaner 1 can be taken into account in the data and in the display generated from them on display panel 32. This can be in the form of several tables on paper, or a selection in a data query in the case of a computerised display panel 32.

The user now operates the tank cleaning device described in the foregoing by performing two steps in particular:

he selects a replaceable element from a group 27, 28, 29 of replaceable elements of type 5, 6, 18 and he installs a replaceable element on a tank cleaner 1.

The replaceable element can be selected advantageously by means of a display on a display element 31.

The manufacturer of a tank cleaning device provides a method for cleaning a tank by means of a tank cleaner 1 in which cleaning fluid is dispensed into the tank from a nozzle 6 mounted on a nozzle holder 5 of tank cleaner 1, which nozzle is made to rotate by a drive means 18 that has a drive means component. This method comprises the steps of:

configuring tank cleaner 1 with a replaceable element holder, configuring one of the components drive means 18, drive means component, nozzle holder 5 and nozzle 6 as a replaceable element which can be accommodated in the replaceable element holder and by which a first type of replaceable element is defined, providing a group 27, 28 and 29 comprising a plurality of replaceable elements of one type.

The manufacturer develops the method advantageously by providing a second group comprising a plurality of replaceable elements. This is further improved by the method including the step of:

providing a display element 31 that displays at least one combination of a replaceable element from the first group 27, 28, 29 and a replaceable element from the second group 27, 28, 29.

LIST OF REFERENCE SIGNS

1 Tank cleaner
2 First housing portion
3 Coupling section
4 Second housing portion
5 Nozzle holder
6 Nozzle
7 Interior space
8 Outlet
9 Flow director
10 Drive shaft
11 Drive shaft holder
12 Cover plate
13 Cavity
14 First opening
15 Second opening
16 First ring
17 Second ring
18 Drive means
19 Guide wheel
20 Guide vane
21 Turbine wheel
22 Turbine vane
23 Transmission gear
24 Drive shaft
25 First bevel gear wheel
26 Second bevel gear wheel
27 First group
28 Second group
29 Third group
30 Extension sleeve
31 Display element
32 Display panel
L Longitudinal axis
D Second rotational axis

The invention claimed is:

1. A tank cleaning device comprising a tank cleaner having a plurality of tank cleaner components including a drive means comprising a drive means component, a nozzle holder rotatable about two axes and at least one nozzle arranged on the nozzle holder, a first group of replaceable elements with at least two replaceable elements of a first type with different properties, which influence cleaning performance of the tank cleaner, wherein a replaceable element of the first type is mounted in the tank cleaner and is designed for exchange with another replaceable element of the first type for the purpose of adapting a first parameter of the tank cleaner that influences the cleaning performance, a second group of replaceable elements with at least two replaceable elements of a second type with different properties, which influence the cleaning performance of the tank cleaner, wherein a replaceable element of the second type is mounted in the tank cleaner and is designed for exchange with another replaceable element of the second type in order to adjust a second parameter of the tank cleaner that influences the cleaning performance, wherein a first portion of the tank cleaner forms a first replaceable element holder being configured to hold the first type of replaceable element and a second portion of the tanker cleaner forms a second replaceable element holder being configured to hold the second type of replaceable element, and the nozzle carrier or the nozzle are designed as replaceable elements of the first type and the drive means or the drive means component are designed as replaceable elements of the second type, and wherein the first parameter is one of the following group: (i) number of cleaning jets and (ii) jet width, and the second parameter is rotational speed.

2. The tank cleaning device according to claim 1, further including a display element which displays at least one combination of replaceable elements from the first group and the second group.

3. A method for operating a tank cleaning device, the method comprises the steps of:

providing a tank cleaning device having a tank cleaner having a plurality of tank cleaner components including a drive means comprising a drive means component, a nozzle holder rotatable about two axes and at least one nozzle arranged on the nozzle holder, wherein at least one of the tank cleaner components is designed as a replaceable element, a type of replaceable element is defined by the tank cleaner component designed as the replaceable element, that a first portion of the tank cleaner forms a replaceable element holder being configured to hold a corresponding replaceable element;

selecting a replaceable element from a first group of replaceable elements of a first type;

replacing a replaceable element of the first type which is mounted in the tank cleaner of the tank cleaning device with the selected replaceable element of the first type in order to adjust a parameter of the tank cleaner that influences cleaning performance;

selecting a replaceable element from a second group of replaceable elements of a second type; and, replacing a replaceable element of the second type which is mounted in the tank cleaner of the tank cleaning device with the selected replaceable element of the second type in order to adjust a parameter of the tank cleaner that influences the cleaning performance, wherein the parameter of the tank cleaner adjusted by replacement of the replaceable element of the first type and the parameter of the tank cleaner adjusted by the replacement of the replaceable element of the second type are selected from the following group of parameters: i) number of cleaning jets, (ii) rotational speed, (iii) jet width, in order to adjust at least two parameters of the group of parameters.

4. The method according to claim 3, wherein the replaceable element is selected by means of a display on a display element.

5. The method according to claim 4, wherein the display element displays at least one combination of replaceable elements from the first group and from the second group and that the first replaceable element and the second replaceable element are selected on the basis of said display.

6. The method according to claim 3, wherein the drive means is powered by cleaning fluid flowing through the tank cleaner.

7. A method for producing a modular tank cleaner in which cleaning fluid is dispensed into a tank from a nozzle installed on a nozzle holder of said tank cleaner, which nozzle holder is made to rotate by a drive means that has a drive means component, said method comprises the steps of:

configuring a first portion of the tank cleaner to form a first replaceable element holder and a second portion of the tank cleaner to form a second replaceable element holder, configuring the drive means or the drive means component as a replaceable element which can be accommodated in the first replaceable element holder and by which a first type of replaceable element is defined, wherein the first replaceable element holder is configured to hold the first type of replaceable element, configuring one of the nozzle holder and the nozzle as a replaceable element which can be accommodated in the second replaceable element holder and by which a second type of replaceable element is defined, wherein the second replaceable element holder is configured to hold the second type of replaceable element, providing a first group comprising a plurality of replaceable elements of the first type allowing parameters that change cleaning performance to be adjusted in a targeted manner, and providing a second group comprising a plurality of replaceable elements of the second type allowing parameters that change the cleaning performance to be adjusted in a targeted manner, wherein the parameters that change the cleaning performance are selected from the following group: number of cleaning jets, rotational speed, jet width.

8. The method according to claim 7, wherein the method comprises the steps of:

providing a display element that displays at least one combination of a replaceable element from the first group and a replaceable element from the second group.

* * * * *